US012675301B2

(12) United States Patent
Sensoy

(10) Patent No.: US 12,675,301 B2
(45) Date of Patent: Jul. 7, 2026

(54) METHODS AND SYSTEMS FOR REIDENTIFICATION IN A USER INTERFACE

(71) Applicant: BLUE PRISM LIMITED, Warrington (GB)

(72) Inventor: Murat Sensoy, London (GB)

(73) Assignee: BLUE PRISM LIMITED, Warrington (GB)

( * ) Notice: Subject to any disclaimer, the term of this patent is extended or adjusted under 35 U.S.C. 154(b) by 274 days.

(21) Appl. No.: 18/164,472

(22) Filed: Feb. 3, 2023

(65) Prior Publication Data

US 2023/0251879 A1 Aug. 10, 2023

(30) Foreign Application Priority Data

Feb. 8, 2022 (EP) .................................... 22155721

(51) Int. Cl.
*G06F 9/451* (2018.01)
*G06F 40/154* (2020.01)

(52) U.S. Cl.
CPC ............ *G06F 9/451* (2018.02); *G06F 40/154* (2020.01)

(58) Field of Classification Search
CPC .......... G06F 9/451; G06F 40/154; G06F 8/33; G06F 8/34; G06F 8/38
See application file for complete search history.

(56) References Cited

U.S. PATENT DOCUMENTS 10,831,634 B1 * 11/2020 Ritter ........................ G06F 9/451
10,853,114 B2 * 12/2020 Agarwal ............. G06F 9/45558
11,232,170 B1 * 1/2022 Dines .................. G06F 16/9574
11,294,793 B1 * 4/2022 Stan ..................... G06F 11/3664
12,346,708 B1 * 7/2025 Agarwal ................ G06F 9/451
2011/0276944 A1 * 11/2011 Bergman ........... G06F 11/3684
717/124
2014/0189576 A1 * 7/2014 Carmi .................. G06V 10/757
715/781
2017/0255475 A1 * 9/2017 Seolas ..................... G06F 40/14

(Continued)

OTHER PUBLICATIONS

International Patent Application No. PCT/EP2023/052963; Int'l Search Report and the Written Opinion; dated Apr. 19, 2023; 18 pages.

(Continued)

*Primary Examiner* — Hien L Duong

(74) *Attorney, Agent, or Firm* — BakerHostetler

(57) ABSTRACT

There is provided a method (100) for performing description mining for a concept. The method comprises: acquiring (S110) a plurality of reference descriptions, wherein each of the plurality of reference descriptions is associated with a user interface (UI) element corresponding to a type of UI element represented by the concept; generating (S120), based on the plurality of reference descriptions, at least one of a local description for the concept and a global description for the concept, wherein the local description for the concept comprises a description component that is specific to a respective UI, and wherein the global description for the concept comprises a description component that is not specific to a UI; and storing (S130) the at least one of generated local description and global description such that it is associated with a concept identifier corresponding to the concept.

16 Claims, 3 Drawing Sheets

(56) References Cited

U.S. PATENT DOCUMENTS

| | | | | |
|---|---|---|---|---|
| 2018/0199156 A1* | 7/2018 | Gandhi | .................. | H04W 4/06 |
| 2020/0004798 A1* | 1/2020 | Weinert, Jr. | ........ | G06F 16/9577 |
| 2020/0226249 A1* | 7/2020 | Zhan | ......................... | G06F 9/54 |
| 2020/0249964 A1* | 8/2020 | Fernandes | ............... | G06F 9/451 |
| 2020/0401431 A1 | 12/2020 | Rashid et al. | | |
| 2021/0109722 A1* | 4/2021 | Ripa | ......................... | G06F 8/34 |
| 2021/0129325 A1* | 5/2021 | Yu | ...................... | G05B 19/4155 |
| 2021/0141497 A1* | 5/2021 | Magureanu | ............. | G06F 9/451 |
| 2021/0200560 A1* | 7/2021 | Munteanu | ................ | G06N 3/08 |
| 2021/0304064 A1* | 9/2021 | Mudi | ..................... | G06N 3/044 |
| 2021/0349430 A1* | 11/2021 | Munteanu | ................. | G06F 8/34 |
| 2022/0012024 A1 | 1/2022 | Grigore | | |
| 2022/0012152 A1* | 1/2022 | Dines | ................. | G06F 11/3476 |
| 2022/0075510 A1* | 3/2022 | Dines | ................. | G06F 3/04842 |
| 2022/0197676 A1* | 6/2022 | Dines | ................... | G06F 3/0482 |
| 2022/0244975 A1* | 8/2022 | Begert | ...................... | G06F 8/73 |
| 2022/0405064 A1* | 12/2022 | Silverstein | .......... | G06F 3/04812 |
| 2023/0191601 A1* | 6/2023 | Grigore | ................. | B25J 9/1661 |
| | | | | 700/246 |
| 2023/0214239 A1* | 7/2023 | Singh | ...................... | G06F 9/451 |

OTHER PUBLICATIONS

European Patent Application No. 22155721.8; Extended Search Report; dated Jul. 14, 2022; 13 pages.

Assia Benbihi; "Robust Visual Features for Long-Term Monitoring"; Signal and Image Processing; Thales Georgia Tech; May 2020; 193 pages.

Loncomilla et al.; "Object recognition using local invariant features for robotic applications: A Survey"; Pattern Recognition; vol. 60; 2015; p. 499-514.

* cited by examiner

100

Acquiring reference descriptions — S110

Generating local/global descriptions — S120

Storing local/global descriptions with concept identifier — S130

200

Retrieving first local/global description — S210

Querying current UI representation — S220

METHODS AND SYSTEMS FOR REIDENTIFICATION IN A USER INTERFACE

FIELD OF THE DISCLOSURE

The present disclosure relates to methods and systems for reidentification in a user interface. More specifically, the present disclosure relates to systems and computer-implemented methods for performing description mining for a concept, and for performing reidentification check for a user interface element in a current user interface.

BACKGROUND

Human guided computer processes are ubiquitous across many fields of technology and endeavour. Modern graphical user interfaces (GUIs) have proven invaluable in allowing human operators to use computer systems to carry out often complex data processing and/or systems control tasks. However, whilst GUIs often allow human operators to quickly become accustomed to performing new tasks, they provide a high barrier to any further automation of tasks.

Traditional workflow automation aims to take tasks usually performed by operators using GUIs and automate them so that a computer system may carry out the same task without significant re-engineering of the underlying software being used to perform the task. Initially, this required exposing application programming interfaces (APIs) of the software so that scripts may be manually devised to execute the required functionality of the software so as to perform the required task.

Robotics Process Automation (RPA) is an emerging form of business process automation technology utilising software robots or artificial intelligence (AI) workers. In conventional workflow automation tools, a software developer produces a list of actions to automate a task using internal application program interfaces. In contrast, RPA systems develop an action list by watching a user perform a task in the application's graphical user interface, and then perform the automation by repeating those tasks directly on the graphical user interface. RPA robots can then generate the appropriate input commands for the GUI to cause a given process to be carried out by the computer system. This enables the automation of processes, turning attended processes into unattended processes. The advantages of such an approach are multitude and include greater scalability allowing multiple RPA robots to perform the same task across multiple computer systems, along with a greater repeatability as the possibility for human error in a given process in reduced or even eliminated.

SUMMARY

Existing approaches for automation usually rely on extracting unique identifiers for user interface (UI) elements and building automation based on these identifiers. Examples of such identifiers for web-based applications are Extensible Markup Language Path Language (XPath) expressions and Cascading Style Sheets (CSS) selectors, which may also be combined with various properties of the UI element. The unique identifier is usually defined manually by the RPA developer during the application modelling or workflow development. However, these unique identifiers can be easily affected by the changes in the UI. For example, an XPath expression may be invalidated by the addition of a new ancestor (e.g., a container invisible to the user) or a change of identifiers of an existing ancestor element.

Some identifiers for UI elements are more robust to changes in the UI and a domain expert may use such identifiers to identify the UI elements. While doing so, the expert may use trial-and-error in addition to the domain knowledge. The proposed methods and systems herein are inspirited from this—they are based on the idea of keeping the representations of the UI over time and exploiting these possibly different versions of the UI to extract more robust and consistent identifiers automatically using pattern mining techniques. Also, according to some embodiments described herein, the domain knowledge can be partially captured as a concept hierarchy, which can be understood as an ontology of UI elements.

Embodiments described herein are directed towards methods and systems for performing description mining for a concept, and for performing reidentification check for a UI element in a current UI.

According to an aspect of the present disclosure, there is provided a computer-implemented method for performing description mining for a concept. The method comprises: acquiring a plurality of reference descriptions, wherein each of the plurality of reference descriptions is associated with a user interface (UI) element corresponding to a type of UI element represented by the concept; generating, based on the plurality of reference descriptions, at least one of a local description for the concept and a global description for the concept, wherein the local description for the concept comprises a description component that is specific to a respective UI, and wherein the global description for the concept comprises a description component that is not specific to a UI; and storing the at least one of generated local description and global description such that it is associated with a concept identifier corresponding to the concept.

According to another aspect of the present disclosure, there is provided a computer-implemented method for performing reidentification check for a user interface (UI) element, in a current UI. The method comprises: retrieving, for the UI element, at least one of a stored first local description and a stored first global description, based on a concept identifier representing the UI element; and querying a representation of the current UI using the at least one first stored local description and first stored global description to determine whether the respective description can be used to reidentify the UI element.

According to another aspect of the present disclosure, there is provided a system for performing description mining for a concept. The system comprises: an acquiring unit configured to acquire a plurality of reference descriptions, wherein each of the plurality of reference descriptions is associated with a user interface (UI) element corresponding to a type of UI element represented by the concept; a generating unit configured to generate, based on the plurality of reference descriptions, at least one of a local description for the concept and a global description for the concept, wherein the local description for the concept comprises a description component that is specific to a respective UI, and wherein the global description for the concept comprises a description component that is not specific to a UI; and a storing unit configured to store the at least one of generated local description and global description such that it is associated with a concept identifier corresponding to the concept.

According to another aspect of the present disclosure, there is provided a system for performing reidentification check for a user interface (UI) element, in a current UI. The system comprises: a retrieving unit configured to retrieve, for the UI element, at least one of a stored first local description and a stored first global description, based on a concept identifier representing the UI element; and a querying unit configured to query a representation of the current UI using the at least one first stored local description and first stored global description to determine whether the respective description can be used to reidentify the UI element.

Optional features are set out in the appended dependent claims.

These, and other, aspects of the present disclosure will be better appreciated and understood when considered in conjunction with the following description and the accompanying drawings. The following description, while indicating various embodiments of the disclosure and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

Embodiments of the present disclosure will now be described, by way of example only, with reference to the accompanying drawings, in which.

DETAILED DESCRIPTION

In the following description, numerous specific details are set forth in order to provide a thorough understanding of the embodiments. It will be apparent, however, to one having ordinary skill in the art the specific detail need not be employed to practice the embodiments. In other examples, well-known materials or methods have not been described in detail in order to avoid obscuring the present disclosure.

Figure 1:
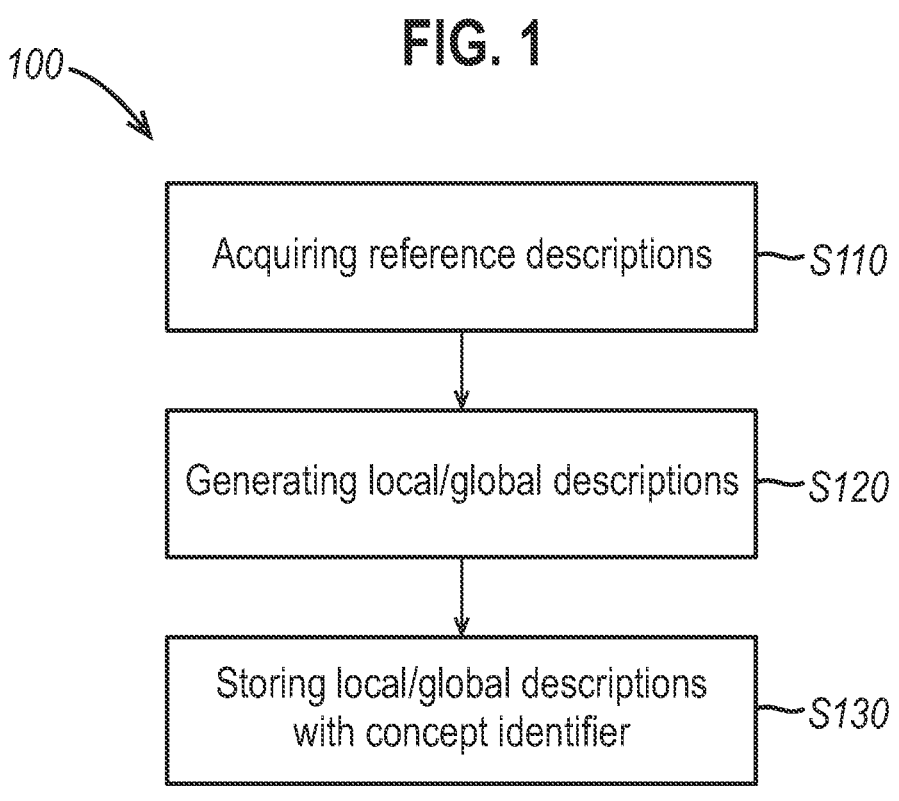
FIG. 1 is a flowchart of a computer-implemented method for performing description mining for a UI concept, according to an embodiment of the present disclosure.

FIG. 1 is a flowchart of a computer-implemented method for performing description mining for a UI concept (herein referred to merely as "concept"), according to an embodiment of the present embodiment.

The method 100 begins at step S110 at which a plurality of reference descriptions are acquired. Each of the plurality of reference descriptions is associated with a user interface (UI) element corresponding to a type of UI element represented by the concept.

In the context of the present embodiment, a description (such as a reference description, a local description, and a global description) may be indicative of at least one of a location and an attribute of a respective UI element or a respective concept. For example, in some embodiments, each of the plurality of reference descriptions acquired at step S110 may be in the form of one of: a Cascading Style Sheets (CSS) selector, an Extensible Markup Language Path Language (XPath) expression, and an image and/or audio description. An image description may be, for example, a computer vision (CV) description.

As an example, the concept in question may represent an "OK button" type UI element. In this example, the plurality of references descriptions may each be a description for a different "OK button", e.g. from different UIs and/or different versions of a UI. For example, the plurality of reference descriptions may be XPath expressions of OK buttons of different UIs and/or different versions of a specific UI.

In some embodiments, the plurality of reference descriptions may comprise at least one of a local historical reference description and a non-local reference description. In these embodiments, a local historical reference description is specific to a current UI (e.g. a UI being used by a user), and a non-local reference description is not specific to the current UI. For example, a local historical reference description may correspond to a UI element that is part of the current UI. For example, a non-local reference description may correspond to a UI element that is not part of the current UI, but a UI that is similar to the current UI.

Then, at step S120, at least one of a local description for the concept and a global description for the concept is generated based on the plurality of reference descriptions acquired at step S110. The local description for the concept comprises a description component that is specific to a respective UI, e.g. a current UI. The global description for the concept comprises a description component that is not specific to a UI, and thus the global description can be reused in different UIs (e.g. different applications or webpages). In some cases, multiple local/global descriptions that correspond to different parallel ways for identifying a respective concept/UI element can be generated at step S120. For example, the generated descriptions may include an XPath expression, a CSS selector, a CV description, etc. In these examples, even if one form/type of description becomes invalid, another form/type can still be used for the purpose of identifying an UI element. Furthermore, in some embodiments, the former description (i.e. the description that became invalid) can be updated using data from the UI element identified using the latter (i.e. the description that is used for the purpose of identifying the UI element).

In some embodiments, generating a local description at S120 may comprise updating an existing local description for the concept. Alternatively, or in addition, in some embodiments generating a global description at step S120 may comprise updating an existing global description for the concept. These existing descriptions may be stored in a database (e.g. the "UI Concepts Descriptions" storage shown in FIG. 5).

The generation of the local and/or global descriptions may involve performing pattern mining with respect to at least the plurality of reference descriptions. In more detail, in some embodiments, generating a local description for the concept at S120 may comprise determining a common description component from a plurality of local historical reference descriptions. Alternatively, or in addition, generating a global description for the concept at S120 may comprise determining a common description component from a plurality of non-local reference descriptions. In these embodiments, determining the common description component may be performed using a trained machine learning model. For example, determining the common description component may be performed using a number of machine learning technique such as neural networks based on computer vision, decision trees using structured information from a DOM tree (e.g., tags, text content), or version space methods based on features of the UI elements.

Subsequently, at step S130, the at least one of generated local description and global description generated at step S120 is stored such that it is associated with a concept identifier corresponding to the concept. In some embodiments, the concept identifier may uniquely identify the concept in a collection of concepts. For example, the concept identifier can indicate an order of the type of UI element represented by the concept in an ontology of a plurality of different types of UI elements. The collection of concepts may be a concept hierarchy in which concepts are presented based on the types of UI elements represented by the concept, e.g. "OK button" and "login button" would be sub-concepts falling under the more general concept of "submit button" in the hierarchy. The concept hierarchy may represent domain knowledge of an expert in the field of automation, more specifically robotics process automation.

In some embodiments, the method 100 may further comprise acquiring a user input accepting or rejecting the at least one of generated local description and generated global description. In these embodiments, storing of the generated local description and/or the generated global description at step S130 may only be performed upon acquiring the user input accepting the respective generated local description or generated global description.

As mentioned above with reference to S120, in some embodiments generating a local description for the concept at S120 may comprise determining a common description component from a plurality of local historical reference descriptions. In these embodiments, storing the generated local description at S130 may comprise storing the determined common description component as at least part of the local description.

Also, as mentioned above with reference to S120, in some embodiments generating a global description for the concept at S120 may comprise determining a common description component from a plurality of non-local reference descriptions. In these embodiments, storing the generated global description at S130 may comprise storing the determined common description component as at least part of the global description.

Although not shown in the flowchart of FIG. 1, in some embodiments the method 100 may further comprise acquiring, for each of the plurality of reference descriptions acquired at step S110, a corresponding UI representation. In these embodiments, generating a local description for the concept or a global description for the concept at step S120 may be further based on an interrelationship between a reference description and the corresponding UI representation.

A UI representation in some embodiments may comprise at least one of a structured representation of the respective UI and an unstructured representation of the respective UI. For example, a structured representation may comprise a document object model (DOM) tree. As another example, the unstructured representation of a UI may comprise a screenshot of the respective UI.

Furthermore, although not shown in the flowchart of FIG. 1, in some embodiments the method 100 may further comprise, prior to acquiring a representation of a corresponding UI for a respective reference description, generating an updated UI representation by removing information content from an original UI representation. Thus, in these embodiments, the acquired representation may be the updated representation (instead of the original representation). As an example, the original UI representation may comprise a DOM tree, and the information content (that is removed) may comprise text nodes and/or image nodes in the DOM tree. The updated representation may be regarded as a "privacy ensured" version of the UI representation, since information content that could cause privacy concerns has been removed from this version.

In some embodiments, the method 100 may further comprise, prior to generating at least one of a local description and a global description for the concept at step S120, determining whether a predetermined trigger condition is met. In these embodiments, the generation of at least one of a local description and a global description at step S120 may only be performed if it is determined that the predetermined trigger condition is met. The predetermined trigger condition may be associated with at least one of: a predetermined time interval, storage of a new concept instance for the concept, the concept instance comprising a location (e.g. spatial coordinates, or an identifier such as a CSS selector, or a Win32 object attribute) of a respective UI element and a representation of a respective UI, and an instructing user input. A new concept instance may refer to a concept instance associated with a UI element that cannot be identified by an existing description stored with respect to the corresponding concept identifier.

As an example of a predetermined trigger condition, the generation of the local and/or global descriptions may be triggered manually by way of receiving a user input requesting description mining to be performed. As another example, the generation of the local and/or global descriptions may be triggered by a predefined instruction to perform description mining for a specific time interval/frequency, e.g. every Monday.

Although not shown in FIG. 1, in some embodiments the method 100 may further comprise: acquiring a user input, the user input corresponding to assignment of the concept identifier to a first UI element in a respective UI, and storing a concept instance for the concept identifier. The concept instance may comprise a representation of the respective UI, a description of the first UI element, and the concept identifier. For example, a concept instance for the "OK button" concept may comprise a representation (e.g. a DOM tree) of the UI containing the OK button, an XPath expression of the OK button, and the concept identifier for "OK button" (which may be "OK button" itself or an arbitrary identifier). Thus, each UI element in a user interface can be regarded as an instance of a concept in the context of the present disclosure. As mentioned above, the storage of a (new) concept instance can be a predetermined trigger condition for initiating the generation of at least one of a local description and a global description.

Figure 2:
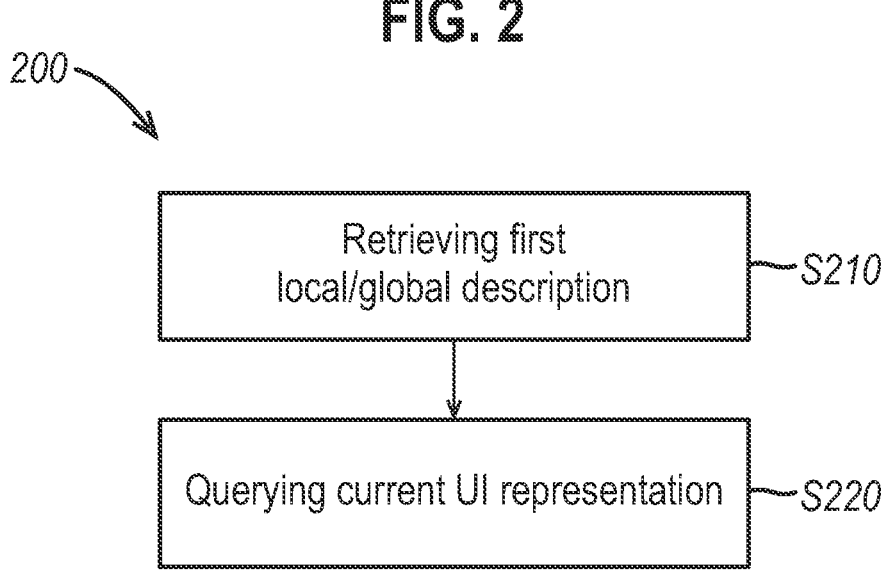
FIG. 2 is a flowchart of a method for performing reidentification check for a UI element, in a current UI, according to an embodiment of the present disclosure

FIG. 2 is a flowchart of a method for performing reidentification check for a UI element, in a current UI, according to an embodiment of the present disclosure. In some embodiments, the UI element may be part of an action of an automation workflow. Also, in some embodiments, performing reidentification check of the UI element as described as follows may be a part of execution of an automation workflow.

The method 200 begins at step S210 at which at least one of a stored first local description and a stored first global description is retrieved for the UI element. This retrieval is based on a concept identifier representing the UI element. For example, if the UI element is an "OK button", it may be associated with a concept identifier that identifies "OK button" as the associated concept. The first local description and/or the first global description may have been generated for the concept based on the method as described above with reference to FIG. 1.

As mentioned above, in some embodiments the UI element may be part of an action of an automation workflow. In these embodiments, prior to retrieving the at least one of a stored first local description and a first stored global description at step S210, the method may further comprise acquiring the automation workflow, the automation workflow including at least the action involving the UI element. In a practical implementation, the automation workflow may include a plurality of actions, each involving a number of UI elements. Acquiring the automation workflow may comprise receiving a user input corresponding to the action in the automation workflow. For example, the user input may correspond to an operation to create the corresponding action in the automation workflow.

Returning to FIG. 2, at step S220, a representation of the current UI is queried using the at least one first stored local description and first stored global description, so as to determine whether the respective description can be used to reidentify the UI element. For example, the first local description may be an XPath expression and at step S220 a DOM tree representing the current UI may be queried to determine whether there is a match for this XPath expression in the DOM tree. If it is determined that there is a match, then reidentification of the UI element is successful. On the other hand, if it is determined that there is not a match, then reidentification of the UI element is not successful.

In the context of the present disclosure, it is understood that the terms "reidentification" and "reidentify" may refer to the process of identifying a UI element from a UI (e.g. by way of finding a match in the UI representation), or more specifically from a UI representation (e.g. a DOM tree). Thus, it is not a prerequisite for the UI element to have been "identified" previously for it to be "reidentified" at step S220. Furthermore, the terms "reidentification" and "reidentify" may also refer to a scenario in which the UI element cannot be identified using a local/global description and thus a different local/global description is used to perform the "reidentification" (e.g. by way of finding a match in the UI representation). This will be explained in more detail below with respect to scenarios in which the first local/global description cannot be used to reidentify the UI element and a second local/global description is retrieved for reidentification check.

In some embodiments where a stored first local description and a stored first global description are both available, and the method may comprise retrieving, at step S210, at least the first local description based on the concept identifier, and querying, at step S220, the presentation of the current UI using the first local description. In this way, the method can prioritise the use of a local description over a global description in the reidentification check, which may provide more reliable results since a local description is specific to the current UI.

In some embodiments, the method may further comprise, storing the representation of the current UI and the first local description and/or the first global description such that they are associated with the concept identifier, if it is determined at step S220 that the first local description and/or the first global description can be used to reidentify the UI element.

Alternatively, if it is determined at step S220 that the first local description and/or the first global description cannot be used to reidentify the UI element, the method may further comprise discarding the first local description and/or the first global description that cannot be used for reidentification.

Alternatively or in addition, if it is determined at step S220 that the first local description and/or the first global description cannot be used to reidentify the UI element, the method may further comprise retrieving at least one of: a stored second local description and a stored second global description based on the concept identifier, the second local description being different from the first local description and the second global description being different from the second global description, and querying the representation of the current UI using the at least one of second local description and second global description to determine whether the respective description can be used to reidentify the UI element.

As yet another alternative, in some embodiments if it is determined that the first local description and/or the first global description cannot be used to reidentifying the UI element, the method may further comprise requesting user input to indicate the UI element in the current UI and/or performing description mining for the concept. The description mining may be performed in accordance with the method as described above with reference to FIG. 1.

Figure 5:
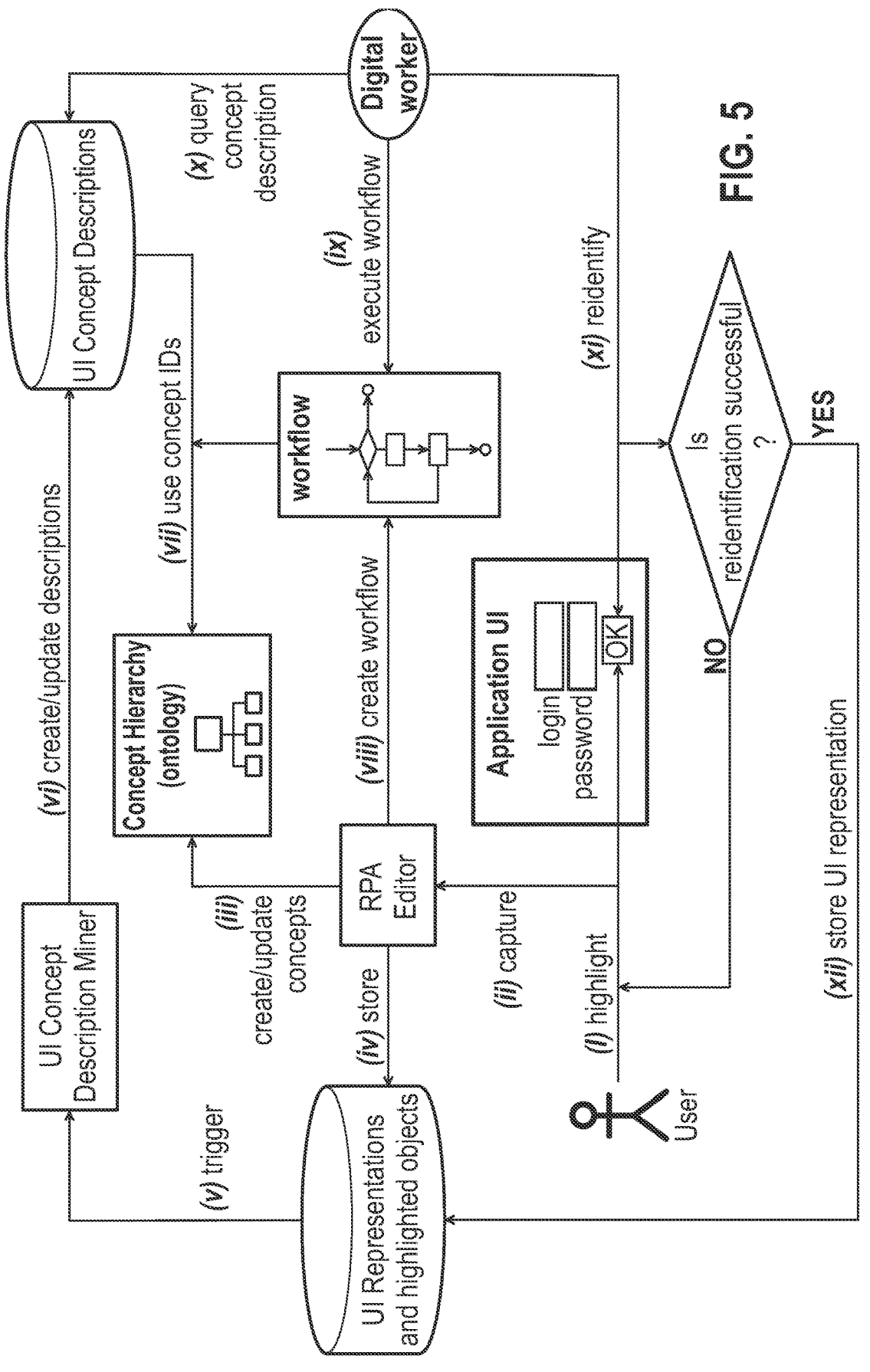
FIG. 5 is a diagram illustrating an exemplary process for performing description mining for a concept and performing reidentification check for a UI element in a current UI, according to an embodiment of the present disclosure.

It will be appreciated in some embodiments of the present disclosure, the methods illustrated in FIGS. 1 and 2 can be combined in certain embodiments to allow both description mining and reidentification check to be carried out. An exemplary process in which both description mining and reidentification check are carried out is illustrated in FIG. 5 and will be explained in more detail with reference to the drawing below.

Figure 3:
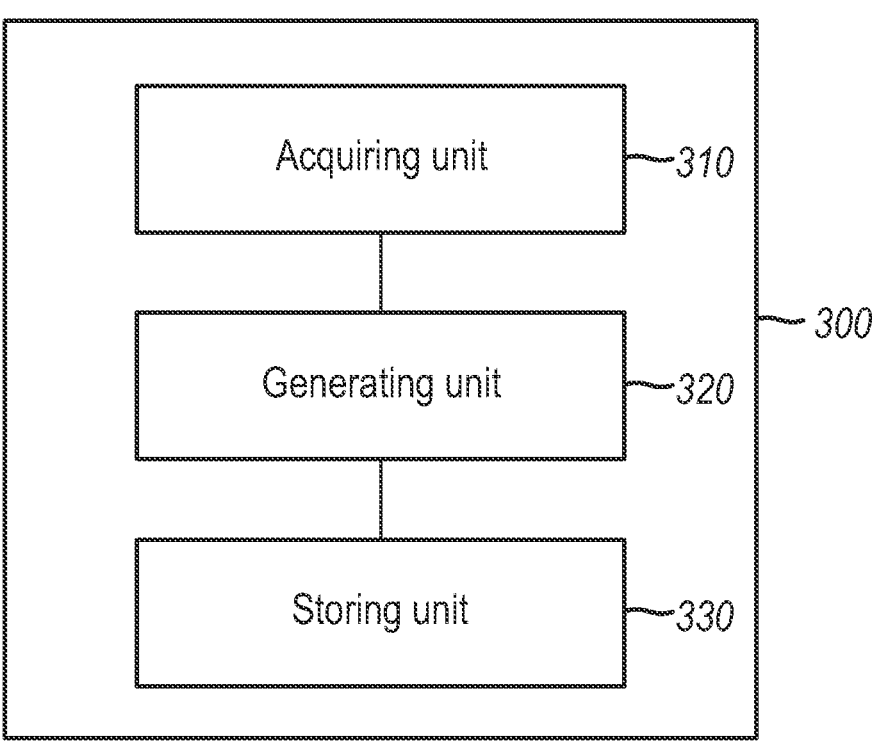
FIG. 3 is a block diagram of a system for performing description mining for a concept, according to an embodiment of the present disclosure.

FIG. 3 is a block diagram of a system for performing description mining for a concept, according to an embodiment of the present disclosure.

As shown in FIG. 3, there is provided a system 300 comprising an acquiring unit 310, a generating unit 320, and a storing unit 330.

The acquiring unit 310 is configured to acquire a plurality of reference descriptions. Each of the plurality of reference descriptions is associated with a UI element corresponding to a type of UI element represented by the concept.

As explained above with reference to FIG. 1, a description (such as a reference description, a local description, and a global description) may be indicative of at least one of a location and an attribute of a respective UI element or a respective concept. For example, in some embodiments, each of the plurality of reference descriptions acquired by the acquiring unit 310 may be in the form of one of: a Cascading Style Sheets (CSS) selector, an Extensible Markup Language Path Language (XPath) expression, and an image and/or audio description. An image description may be, for example, a computer vision (CV) description.

In some embodiments, the plurality of reference descriptions may comprise at least of a local historical reference description and a non-local reference description. In these embodiments, a local historical reference description is specific to a current UI, and a non-local reference description is not specific to the current UI. For example, a local historical reference description may correspond to a UI element that is part of the current UI. For example, a non-local reference description may correspond to a UI element that is not part of the current UI, but a UI that is similar to the current UI.

The generating unit 320 is configured to generate at least one of a local description for the concept and a global description for the concept based on the plurality of reference descriptions acquired by the acquiring unit 310. The local description for the concept comprises a description component that is specific to a respective user interface (UI).

The global description for the concept comprises a description component that is not specific to a UI, and thus the global description can be reused in different UIs (e.g. different applications or webpages). The generation of the local and/or global descriptions may involve performing pattern mining with respect to at least the plurality of reference descriptions. In some cases, multiple local/global descriptions that correspond to different parallel ways for identifying a respective concept/UI element can be generated by the generating unit 320. Thus, in some embodiments if one form/type of description becomes invalid, another form/type of description can be used instead to identify a UI element. In addition, the description that became invalid can be updated using data from the UI element identified using the other description.

In some embodiments, the generating unit 320 may be configured to generate a local description by updating an existing local description for the concept. Alternatively, or in addition, in some embodiments the generating unit 320 may be configured to generate a global description by updating an existing global description for the concept. These existing descriptions may be stored in a UI Concepts Descriptions storage (e.g. the "UI Concepts Descriptions" storage shown in FIG. 5).

The generating unit 320 may be configured to generate a local description for the concept by determining a common description component from a plurality of local historical reference descriptions. Alternatively, or in addition, the generating unit 320 may be configured to generate a global description for the concept by determining a common description component from a plurality of non-local reference descriptions. Furthermore, in these embodiments, the generating unit 320 may be configured to determine the common description component using a trained machine learning model. For example, determining the common description component may be performed using a number of machine learning technique such as neural networks based on computer vision, decision trees using structured information from a DOM tree (e.g., tags, text content), or version space methods based on features of the UI elements.

The storing unit 330 is configured to store the at least one of generated local description and global description such that it is associated with a concept identifier corresponding to the concept. In some embodiments, the concept identifier may uniquely identify the concept in a collection of concepts. For example, the concept identifier can indicate an order of the type of UI element represented by the concept in an ontology of a plurality of different types of UI elements. The collection of concepts may be a concept hierarchy in which concepts are presented based on the types of UI elements represented by the concept, e.g. "OK button" and "logins button" would be sub-concepts falling under the more general concept of "submit button" in the hierarchy. The concept hierarchy may represent domain knowledge of an expert in the field of automation, more specifically robotics process automation.

In some embodiments, the acquiring unit 310 may be further configured to acquire a user input accepting or rejecting the at least one of generated local description and generated global description. In these embodiments, the storing unit 330 is configured to only store the generated local description and/or the generated global description upon the acquiring unit 310 acquiring the user input accepting the respective generated local description or generated global description.

As mentioned above, in some embodiments the generating unit 320 may be configured to generate a local description for the concept by determining a common description component from a plurality of local historical reference descriptions. In these embodiments, the storing unit 330 may be configured to store the generated local description by storing the determined common description component as at least part of the local description.

Also, as mentioned above, in some embodiments the generating unit 320 may be configured to generate a global description for the concept by determining a common description component from a plurality of non-local reference descriptions. In these embodiments, the storing unit 330 may be configured to store the generated global description by storing the determined common description component as at least part of the global description.

In some embodiments, the acquiring unit 310 may be further configured to acquire, for each of the plurality of reference descriptions, a corresponding UI representation. In these embodiments, the generating unit 320 may be configured to generate a local description for the concept or a global description for the concept further based on an interrelationship between a reference description and the corresponding UI representation.

A UI representation in some embodiments may comprise at least one of a structured representation of the respective UI and an unstructured representation of the respective UI. For example, a structured representation may comprise a document object model (DOM) tree. As another example, the unstructured representation of a UI may comprise a screenshot of the respective UI.

In some embodiments, the generating unit 320 may be configured to generate an updated UI representation by removing information content from an original UI representation. This operation may be performed prior to the acquiring unit 310 acquiring a representation of a corresponding UI fora respective reference description. In these embodiments, the acquired representation may be the updated representation. For example, the original UI representation may comprise a DOM tree, and the information content (that is removed) may comprise text nodes and/or image nodes in the DOM tree. The updated representation may be regarded as a "privacy ensured" version of the UI representation, since information content that could cause privacy concerns has been removed from this version.

Although not shown in FIG. 3, in some embodiments the system 300 may further comprise a determining unit configured to determine whether a predetermined trigger condition is met, prior to the generating unit 320 generating at least one of a local description and a global description for the concept. In these embodiments, the generating unit 320 may be configured such that the generation of at least one of a local description and a global description is only be performed if it is determined by the determining unit that the predetermined trigger condition is met. The predetermined trigger condition may be associated with at least one of: a predetermined time interval, storage of a new concept instance for the concept, the concept instance comprising a location (e.g. spatial coordinates) of a respective UI element and a representation of a respective UI, and an instructing user input. A new concept instance may refer to a concept instance associated with a UI element that cannot be identified by an existing description stored with respect to the corresponding concept identifier.

As an example of a predetermined trigger condition, the generation of the local and/or global descriptions by the generating unit 3120 may be triggered manually by way of receiving a user input requesting description mining to be performed. As another example, the generation of the local and/or global descriptions may be triggered by a predefined instruction to perform description mining for a specific time interval/frequency, e.g. every Monday.

In some embodiments, the acquiring unit 310 may be further configured to acquire a user input, the user input corresponding to assignment of the concept identifier to a first UI element in a respective UI. Furthermore, in these embodiments, the storing unit 330 may be further configured to store a concept instance for the concept identifier, the concept instance comprising: a representation of the respective UI, a description of the first UI element, and the concept identifier. For example, a concept instance for the "OK button" concept may comprise a representation (e.g. a DOM tree) of the UI containing the OK button, an XPath expression of the OK button, and the concept identifier for "OK button" (which may be "OK button" itself or an arbitrary identifier). Thus, each UI element in a user interface can be regarded as an instance of a concept in the context of the present disclosure. As mentioned above, the storage of a (new) concept instance can be a predetermined trigger condition for initiating the generation of at least one of a local description and a global description.

Although not illustrated in FIG. 3, in some embodiments the components including the acquiring unit 310, the generating unit 320, and the storing unit 330 may be implemented as a combination of a processing circuitry and a memory in the system 300.

Figure 4:
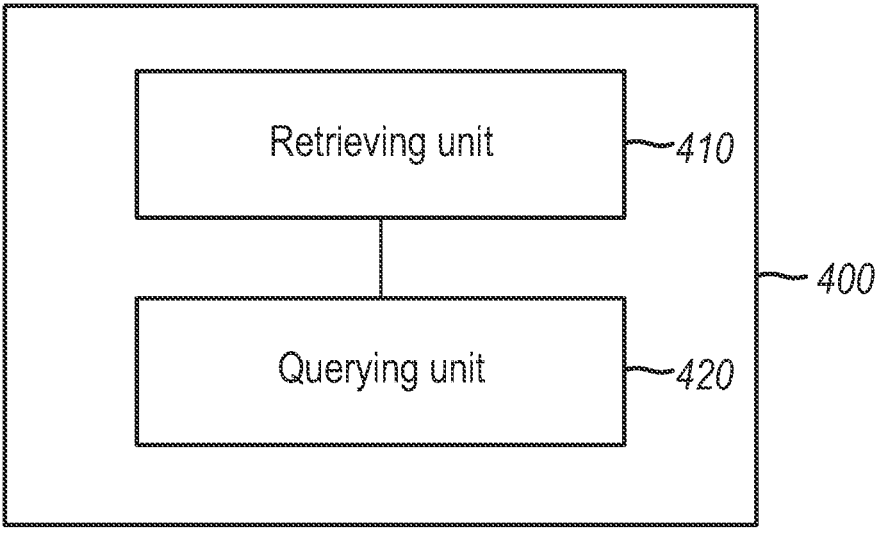
FIG. 4 is a block diagram of a system for performing reidentification check for a UI element in a current UI, according to an embodiment of the present disclosure.

FIG. 4 is a block diagram of a system for performing reidentification check for a UI element in a current UI, according to an embodiment of the present disclosure. In some embodiments, the UI element may be part of an action of an automation workflow.

As shown in FIG. 4, there is provided a system 400 comprising a retrieving unit 410 and a querying unit 420. The retrieving unit 410 is configured to retrieve, for the UI element, at least one of a stored first local description and a stored first global description, based on a concept identifier representing the UI element. This retrieval is based on a concept identifier representing the UI element. For example, if the UI element is an "OK button", it may be associated with a concept identifier that identifies "OK button" as the associated concept. The first local description and/or the first global description may have been generated for the concept based on the method as described above with reference to FIG. 1 or they may have been generated by the system 300 in the manner as described with reference to FIG. 3.

As mentioned above, in some embodiments the UI element may be part of an action of an automation workflow. In these embodiments, the system 400 may further comprise an acquiring unit (not illustrated in FIG. 4) configured to acquire the automation workflow prior to the retrieving unit 410 retrieving the at least one of a stored first local description and a first stored global description, the automation workflow including at least the action involving the UI element. In a practical implementation, the automation workflow may include a plurality of actions, each involving a number of UI elements. The acquiring unit may be configured to acquire the automation workflow by receiving a user input corresponding to the action in the automation workflow. For example, the user input may correspond to an operation to create the corresponding action in the automation workflow.

The querying unit 420 is configured to query a representation of the current UI using the at least one first stored local description and first stored global description, so as to determine whether the respective description can be used to reidentify the UI element. For example, the first local description may be an XPath expression and the querying unit 420 may be configured to query a DOM tree representing the current UI to determine whether there is a match for this XPath expression in the DOM tree. If it is determined that there is a match, then reidentification of the UI element is successful. On the other hand, if it is determined that there is not a match, then reidentification of the UI element is not successful. In some embodiments, performing reidentification check of the UI element by the querying unit 420 may be regarded as a part of execution of an automation workflow.

As explained above with reference to FIG. 2, the terms "reidentification" and "reidentify" may refer to the process of identifying a UI element from a UI, or more specifically from a UI representation, without necessarily requiring the UI element to have been "identified" previously. Furthermore, the terms "reidentification" and "reidentify" may also refer to a scenario in which the UI element cannot be identified using a local/global description and thus a different local/global description is used to perform the "reidentification".

In some embodiments where a stored first local description and a stored first global description are both available, the retrieving unit 410 may be configured to retrieve at least the first local description based on the concept identifier. Also, the querying unit 420 may be configured to query the presentation of the current UI using the first local description. In this way, the system 400 can prioritise the use of a local description over a global description in the reidentification check, which may provide more reliable results since a local description is specific to the current UI.

In some embodiments, the system 400 may further comprise a storing unit configured to store the representation of the current UI and the first local description and/or the first global description such that they are associated with the concept identifier, if it is determined by the querying unit 420 that the first local description and/or the first global description can be used to reidentify the UI element.

Alternatively, the system 400 may further comprise a discarding unit configured to discard the first local description and/or the first global description if it is determined by the querying unit 420 that the first local description and/or the first global description cannot be used to reidentify the UI element. Furthermore, alternatively or additionally, if it is determined by the querying unit 420 that the first local description and/or the first global description cannot be used to reidentify the UI element, the retrieving unit 410 may be further configured to retrieve at least one of: a stored second local description and a stored second global description based on the concept identifier, the second local description being different from the first local description and the second global description being different from the second global description. Furthermore, the querying unit 420 may be further configured to query the representation of the current UI using the at least one of second local description and second global description to determine whether the respective description can be used to reidentify the UI element.

As yet another alternative, in some embodiments the system 400 may further comprise a requesting unit configured to request user input to indicate the UI element in the current UI and/or performing description mining for the concept, if it is determined by the querying unit 420 that the first local description and/or the first global description cannot be used to reidentifying the UI element. The description mining may be performed in accordance with the method as described above with reference to FIG. 1 and/or performed by the system 300 as described above with reference to FIG. 3.

Although not illustrated in FIG. 4, in some embodiments the components including the retrieving unit 410 and the querying unit 420 may be implemented as a combination of a processing circuitry and a memory in the system 400.

It will be appreciated in some embodiments of the present disclosure, the functions of the systems 300 and 400 illustrated in FIGS. 3 and 4 can be combined in certain embodiments as a single system to allow such system to carry out both description mining and reidentification check.

FIG. 5 is a diagram illustrating an exemplary process for performing description mining for a concept and performing reidentification check for a UI element in a current UI, according to an embodiment of the present disclosure.

As shown in FIG. 5, the process is illustrated by way of a number of steps, numbered (i) to (xi) in the diagram for ease of reference. These steps are explained in more detail below with reference to a user, who may be an automation developer using an RPA editor for building workflows. In the context of the present embodiment, the user is building a workflow with respect to an open application UI by using specific UI elements in the application UI.

(i) The user highlights the UI element of interest. In the example shown in FIG. 5, this is the OK button on the application UI.

(ii) The RPA editor or a system (e.g. the system 300 of FIG. 3) captures the highlighted element. In other words, the highlighted element is located within the current application UI.

(iii) As explained above with reference to FIG. 1, for example, UI elements can be considered as instances or examples of concepts. For example, the OK button in the current UI as shown in FIG. 5 can be considered as an instance of the "OK button" concept or an instance of the "login button" concept, both of which can be in turn be considered an as a sub-concept of the "submit button" concept. The user can create these concepts and place them into an appropriate position within a concept hierarchy, before highlighting respective instances on the UIs. Alternatively, existing concept hierarchies can be used by the user directly.

(iv) A representation of the whole UI and the location of the highlighted UI element within the UI are stored together with the concept identifier (which may also be referred to as "concept ID") as an instance in the "UI Representation and highlighted objects" storage. The representation of the UI can be unstructured (e.g. a screenshot of the UI), or it can be structured (e.g. a DOM tree), or both. The location of the element of interest within the UI representation can be in the form of spatial coordinates or an identifier uniquely identifying it, such as a CSS selector or an XPath expression. If there are privacy concerns, a structed representation of the UI, such as DOM, can be used but with all of the information content (e.g. text and images nodes) removed. The following table provides examples of the information stored for instances under the "OK button" concept. For each application or website, instances can be stored separately for each concept.

TABLE 1

| Examples of stored instances for the concept "OK button" OK Button Concept Instances | | |
|---|---|---|
| | UI Representation | Element Location |
| www.sap.co.uk/login | \<xml> . . . \</xml> | /body/div/span |
| | \<xml> . . . \</xml> | /body/div/div/span |
| | \<xml> . . . \</xml> | /body/div/div/span/span |
| SAP login app | \<xml> . . . \</xml> | [// . . . /] |
| [windows] | \<xml> . . . \</xml> | [// . . . /] |
| | \<xml> . . . \</xml> | [// . . . /] |

(i) In this example, the storage of a new concept instance in the "UI Representations and highlighted objects" database can trigger description miner by a UI Concept Description Miner (which may be referred to as simply the "description miner" herein).

(ii) The description miner creates and/or updates local and global descriptions for the relevant concepts. For example, if the OK button highlighted at step (i) belongs to the SAP website, the description miner can create and/or update the description(s) for the "OK button" concept for this specific website, as well as global description(s) which can be used as default description(s) for the "OK button" concept in other websites and applications. Global descriptions can be generated using all stored information across different websites and applications for this specific concept, while local descriptions can be generated per website or per application. The description miner may be composed of a number of specialised miners in some embodiments. For example, an XPath miner can create and/or update XPath expressions for the respective UI elements, while a CSS miner can create and/or update CSS selectors. Similarly, a Computer Vision (CV) miner can use screenshot(s) of a UI and create CV description(s) for the concept both locally and globally. This means the description miner can produce different types of descriptions for the same concept and store them in a "UI Concept Descriptions" storage. The "mined" descriptions can be scrutinised by human users, so that they can be accepted or rejected after review.

In many cases, even if the element of interest can be located automatically using existing descriptions, it would still be useful to create more efficient and robust (local/global) descriptions over time. For example, an XPath expression may already be enough to locate a submit button instance on a website, but the description miner can produce a more robust CSS selector using a number of stored UI representations of the same website. Therefore, even if the stored XPath expression becomes invalid in the future, the mined CSS selector can be used to self-heal the workflow and reidentify the intended UI element.

(iii) Each mined description is paired a relevant concept identifier (i.e. one corresponding to the concept representing the type of the respective UI element), so they can be queried and accessed through the corresponding concept identifiers.

(iv) The user creates the workflow by using concept identifiers to refer to corresponding elements of interests. Hence, the identifiers of the UI elements and the workflow descriptions are decoupled. This allows subsequent modifying of the descriptions of UI elements (i.e. the concepts) without making any change to the existing workflows.

(v) A digital worker can execute the workflow fully or partially during workflow design time to check whether the workflow or parts of the workflow are working properly. While doing so, concepts are queried to retrieve descriptions of the corresponding UI elements.

(vi) The digital worker uses the retrieved descriptions (i.e. XPath expressions, CSS selectors, etc.) to reidentify the elements of interest. If the element is reidentified correctly, the UI representation and automatically reidentified element is stored for future use, for example to be used to discover better descriptions. If the element cannot be reidentified, the user can be asked to highlight the element again.

(vii) During normal execution of a workflow, if the existing description(s) (retrieved based on concept identifiers) cannot be used to reidentify a UI element, a request can be created for human operators to highlight the unidentified element on a screen—steps (ix) and (x) can be repeated afterwards and the execution of the workflow can be resumed if possible.

It will be appreciated that this description is by way of example only; alterations and modifications may be made to the described embodiment without departing from the scope of the disclosure as defined in the claims.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. For example, in some embodiments there may be provided a computer program product comprising instructions which, when the program is executed by a processor, cause the processor to carry out the method described with respect to FIG. 1 and/or FIG. 2. As another example, in some embodiments there may be provided a computer-readable storage medium comprising instructions which, when executed by a computer, cause the computer to carry out the steps of the method as described in FIG. 1 and/or FIG. 2. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system". Furthermore, embodiments of the present disclosure may take the form of a computer program product embodied in any tangible medium of expression having computer-usable program code embodied in the medium.

Although described in connection with an exemplary computing system environment, embodiments of the present disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers (e.g. desktop computers), server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Any combination of one or more computer-usable or computer-readable media may be utilised. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of embodiments of the present disclosure may be written in any combination of one or more programming languages.

The flowcharts and block diagrams illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

The following is a list of embodiments of the present disclosure:

1. A computer-implemented method for performing description mining for a concept, the method comprising:
   acquiring a plurality of reference descriptions, wherein each of the plurality of reference descriptions is associated with a user interface, UI, element corresponding to a type of UI element represented by the concept;
   generating, based on the plurality of reference descriptions, at least one of a local description for the concept and a global description for the concept, wherein the local description for the concept comprises a description component that is specific to a respective UI, and wherein the global description for the concept comprises a description component that is not specific to a UI; and storing the at least one of generated local description and global description such that it is associated with a concept identifier corresponding to the concept.

2. The method according to embodiment 1, wherein the concept identifier uniquely identifies the concept in a collection of concepts, the collection of concepts being an ontology of a plurality of different types of UI elements.

3. The method according to embodiment 2, wherein the plurality of reference descriptions comprises at least of a local historical reference description and a non-local reference description, wherein a local historical reference description is specific to a current UI, and wherein a non-local reference description is not specific to the current UI.

4. The method according to any one of the preceding embodiments, wherein generating a local description comprises updating an existing local description for the concept, and/or wherein generating a global description comprises updating an existing global description for the concept.

5. The method according to any one of the preceding embodiments, wherein a description is indicative of at least one of a location and an attribute of a respective UI element or a respective concept.

6. The method according to any one of the preceding embodiments, wherein each of the plurality of reference descriptions is in the form of one of: a Cascading Style Sheets, CSS, selector, an Extensible Markup Language Path Language, XPath, expression, and an image and/or audio description.

7. The method according to any one of the preceding embodiments, further comprising: acquiring, for each of the plurality of reference descriptions, a corresponding UI representation, wherein generating a local description for the concept or a global description for the concept is further based on an interrelationship between a reference description and the corresponding UI representation.

8. The method according to embodiment 7, wherein a UI representation comprises at least one of a structured representation of the respective UI and an unstructured representation of the respective UI.

9. The method according to embodiment 8, wherein the structured representation of a UI comprises a document object model, DOM, tree, and/or wherein the unstructured representation of a UI comprises a screenshot of the respective UI.

10. The method according to any one of embodiments 7 to 9, further comprising, prior to acquiring a representation of a corresponding UI for a respective reference description:

generating an updated UI representation by removing information content from an original UI representation, wherein the acquired representation is the updated representation.

11. The method according to embodiment 10, wherein the original UI representation comprises a DOM tree, and wherein the information content comprises text nodes and/or image nodes in the DOM tree.

12. The method according to any one of the preceding embodiments, wherein generating a local description for the concept comprises determining a common description component from a plurality of local historical reference descriptions, and wherein storing the generated local description comprises storing the determined common description component as at least part of the local description.

13. The method according to any one of the preceding embodiments, wherein generating a global description for the concept comprises determining a common description component from a plurality of non-local reference descriptions, and wherein storing the generated global description comprises storing the determined common description component as at least part of the global description.

14. The method according to embodiment 12 or embodiment 13, wherein determining the common description component is performed using a trained machine learning model.

15. The method according to any one of the preceding embodiments, further comprising, prior to generating at least one of a local description and a global description for the concept:

determining whether a predetermined trigger condition is met, wherein generation of at least one of a local description and a global description is only performed if it is determined that the predetermined trigger condition is met.

16. The method according to embodiment 15, wherein the predetermined trigger condition is associated with at least one of:

a predetermined time interval;

storage of a new concept instance for the concept, wherein the concept instance comprises a location of a respective UI element and a representation of a respective UI; and an instructing user input.

17. The method according to embodiment 15 or embodiment 16, further comprising:

acquiring a user input, wherein the user input corresponds to assignment of the concept identifier to a first UI element in a respective UI, storing a concept instance for the concept identifier, the concept instance comprising: a representation of the respective UI, a description of the first UI element, and the concept identifier;

wherein storage of the concept instance is a predetermined trigger condition.

18. The method according to any one of the preceding embodiments, further comprising:

acquiring a user input accepting or rejecting the at least one of generated local description and generated global description, wherein storing of the generated local description and/or the generated global description is only performed upon acquiring the user input accepting the respective generated local description or generated global description.

19. A computer-implemented method for performing reidentification check for a user interface, UI, element, in a current UI, the method comprising:

retrieving, for the UI element, at least one of a stored first local description and a stored first global description, based on a concept identifier representing the UI element; and querying a representation of the current UI using the at least one first stored local description and first stored global description to determine whether the respective description can be used to reidentify the UI element.

20. The method according to embodiment 19, wherein the UI element is part of an action of an automation workflow, and wherein prior to retrieving the at least one of a stored first local description and a first stored global description, the method further comprises acquiring the automation workflow, wherein the automation workflow includes at least the action involving the UI element.

21. The method according to embodiment 20, wherein acquiring the automation workflow comprises receiving a user input corresponding to the action in the automation workflow.

22. The method according to any one of embodiments 19 to 21, wherein performing reidentification check of the UI element is a part of execution of the acquired automation workflow.

23. The method according to any one of embodiments 19 to 22, wherein a stored first local description and a stored first global description are both available, and wherein the method comprises retrieving at least the first local description based on the concept identifier, and querying the presentation of the current UI using the first local description.

24. The method according to any one of embodiments 19 to 23, further comprising, if it is determined that the first local description and/or the first global description can be used to reidentify the UI element, storing the representation of the current UI and the first local description and/or the first global description such that they are associated with the concept identifier.

25. The method according to any one of embodiments 19 to 23, further comprising, if it is determined that the first local description and/or the first global description cannot be used to reidentify the UI element:

retrieving at least one of: a stored second local description and a stored second global description based on the concept identifier, wherein the second local description is different from the first local description and wherein the second global description is different from the second global description; and querying the representation of the current UI using the at least one of second local description and second global description to determine whether the respective description can be used to reidentify the UI element.

26. The method according to any one of embodiments 19 to 23, further comprising, if it is determined that the first local description and/or the first global description cannot be used to reidentifying the UI element, requesting user input to indicate the UI element in the current UI.

27. The method according to any one of embodiments 19 to 23, further comprising, if it is determined that the first local description and/or the first global description cannot be used to reidentifying the UI element, performing description mining for the concept according to any one of embodiments 1 to 18.

28. The method according to any one of embodiments 19 to 27, wherein the first local description and/or the first global description are generated according to any one of embodiments 1 to 18.

29. A system for performing description mining for a concept, the system comprising:

an acquiring unit configured to acquire a plurality of reference descriptions, wherein each of the plurality of reference descriptions is associated with a user interface, UI, element corresponding to a type of UI element represented by the concept;

a generating unit configured to generate, based on the plurality of reference descriptions, at least one of a local description for the concept and a global description for the concept, wherein the local description for the concept comprises a description component that is specific to a respective UI, and wherein the global description for the concept comprises a description component that is not specific to a UI; and a storing unit configured to store the at least one of generated local description and global description such that it is associated with a concept identifier corresponding to the concept.

32. A system for performing reidentification check for a user interface, UI, element, in a current UI, the system comprising:

a retrieving unit configured to retrieve, for the UI element, at least one of a stored first local description and a stored first global description, based on a concept identifier representing the UI element; and a querying unit configured to query a representation of the current UI using the at least one first stored local description and first stored global description to determine whether the respective description can be used to reidentify the UI element.

33. A computer-readable storage medium comprising instructions which, when executed by a computer, cause the computer to carry out the steps of the method of any one of embodiments 1 to 28.

The invention claimed is:

1. A computer-implemented method (100) for performing description mining for a concept, the method comprising:

acquiring (S110) a plurality of reference descriptions, wherein each of the plurality of reference descriptions is associated with a user interface (UI) element corresponding to a type of UI element represented by the concept;

generating (S120), based on the plurality of reference descriptions, at least one of a local description for the concept and a global description for the concept, wherein the local description for the concept comprises a description component that is specific to a respective UI, and wherein the global description for the concept comprises a description component that is not specific to a UI;

storing (S130) the at least one of generated local description and global description such that it is associated with a concept identifier corresponding to the concept;

executing a workflow comprising an action involving the UI element, wherein executing the workflow comprises:

retrieving, for the UI element, at least one of the stored local description and the stored global description, based on the concept identifier; and querying a representation of a current UI using the at least one of stored local description and stored global description to determine whether the respective description can be used to reidentify the UI element;

wherein the method further comprises:

enabling, via the current UI, an interactive prompt requesting user identification when the UI element cannot be reidentified using the respective description; and enabling a user input to identify the UI element via a highlighting action on the current UI in response to the interactive prompt.

2. The method (100) according to claim 1, wherein the concept identifier uniquely identifies the concept in a collection of concepts, the collection of concepts being an ontology of a plurality of different types of UI elements.

3. The method (100) according to claim 1, wherein each of the plurality of reference descriptions is in the form of one of: a Cascading Style Sheets, CSS, selector, an Extensible Markup Language Path Language, XPath, expression, and an image and/or audio description.

4. The method (100) according to claim 1, further comprising:

acquiring, for each of the plurality of reference descriptions, a corresponding UI representation, wherein generating a local description for the concept or a global description for the concept is further based on an interrelationship between a reference description and the corresponding UI representation.

5. The method (100) according to claim 4, further comprising, prior to acquiring a representation of a corresponding UI for a respective reference description:

generating an updated UI representation by removing information content from an original UI representation, wherein the acquired representation is the updated representation.

6. The method (100) according to claim 1, wherein generating a local description for the concept comprises determining a common description component from a plurality of local historical reference descriptions, or wherein generating a global description for the concept comprises determining a common description component from a plurality of non-local reference descriptions.

7. The method (100) according to claim 1, further comprising, prior to generating at least one of a local description and a global description for the concept:

determining whether a predetermined trigger condition is met, wherein generation of at least one of a local description and a global description is only performed if it is determined that the predetermined trigger condition is met.

8. The method (100) according to claim 7, further comprising:

acquiring a user input, wherein the user input corresponds to assignment of the concept identifier to a first UI element in a respective UI, storing a concept instance for the concept identifier, the concept instance comprising: a representation of the respective UI, a description of the first UI element, and the concept identifier;

wherein storage of the concept instance is a predetermined trigger condition.

9. The method (100) according to claim 1, further comprising:

acquiring a user input accepting or rejecting the at least one of generated local description and generated global description, wherein storing of the generated local description or the generated global description is only performed upon acquiring the user input accepting the respective generated local description or generated global description.

10. A computer-implemented method (200) for performing reidentification check for a user interface (UI) element, in a current UI, the method comprising:

retrieving (S210), for the UI element, at least one of a stored first local description and a stored first global description, based on a concept identifier representing the UI element, wherein each of the at least one of the stored first local description and the stored first global description is generated based on a plurality of reference descriptions, each of the plurality of reference descriptions being associated with a UI element corresponding to a type of UI element corresponding to the concept identifier, wherein the stored first local description comprises a description component that is specific to a respective UI, and wherein the stored first global description comprises a description component that is not specific to a UI; and querying (S220) a representation of the current UI using the at least one first stored local description and first stored global description to determine whether the respective description can be used to reidentify the UI element;

enabling, via the current UI, an interactive prompt requesting user identification when the UI element cannot be reidentified using the respective description; and enabling a user input to identify the UI element via a highlighting action on the current UI in response to the interactive prompt.

11. The method (200) according to claim 10, further comprising, if it is determined that the first local description and/or the first global description can be used to reidentify the UI element, storing the representation of the current UI and the first local description and/or the first global description such that they are associated with the concept identifier.

12. The method (200) according to claim 10, further comprising, if it is determined that the first local description and/or the first global description cannot be used to reidentify the UI element:

retrieving at least one of: a stored second local description and a stored second global description based on the concept identifier, wherein the second local description is different from the first local description and wherein the second global description is different from the first global description; and querying the representation of the current UI using the at least one of second local description and second global description to determine whether the respective description can be used to reidentify the UI element.

13. The method (200) according to claim 10, further comprising, if it is determined that the first local description or the first global description cannot be used to reidentifying the UI element, performing at least one of:

requesting user input to indicate the UI element in the current UI; and performing description mining for the concept, wherein performing description mining for the concept comprises:

acquiring a second plurality of reference descriptions, wherein each of the second plurality of reference descriptions is associated with a UI element represented by the concept;

generating, based on the second plurality of reference descriptions, at least one of a second local description for the concept and a second global description for the concept, wherein the second local description for the concept comprises a description component that is specific to a respective UI, and wherein the second global description for the concept comprises a description component that is not specific to a UI; and storing the at least one of generated second local description and second global description such that it is associated with a concept identifier corresponding to the concept.

14. A system (300) for performing description mining for a concept, the system comprising:

at least one processor; and at least one memory storing instructions that, when executed by the at least one processor, cause the system to:

acquire a plurality of reference descriptions, wherein each of the plurality of reference descriptions is associated with a user interface (UI) element corresponding to a type of UI element represented by the concept;

generate, based on the plurality of reference descriptions, at least one of a local description for the concept and a global description for the concept, wherein the local description for the concept comprises a description component that is specific to a respective UI, and wherein the global description for the concept comprises a description component that is not specific to a UI; and store the at least one of generated local description and global description such that it is associated with a concept identifier corresponding to the concept, execute workflow comprising an action involving the UI element, wherein executing the workflow comprises:

retrieving, for the UI element, at least one of the stored local description and the stored global description, based on the concept identifier; and querying a representation of a current UI using the at least one of stored local description and stored global description to determine whether the respective description can be used to reidentify the UI element;

enable, via the current UI, an interactive prompt requesting user identification when the UI element cannot be reidentified using the respective description; and enable a user input to identify the UI element via a highlighting action on the current UI in response to the interactive prompt.

15. A system (400) for performing reidentification check for a user interface (UI) element, in a current UI, the system comprising:

at least one processor; and at least one memory storing instructions that, when executed by the at least one processor, cause the system to:

retrieve, for the UI element, at least one of a stored first local description and a stored first global description, based on a concept identifier representing the UI element, wherein each of the at least one of the stored first local description and the stored first global description is generated based on a plurality of reference descriptions, each of the plurality of reference descriptions being associated with a UI element corresponding to a type of UI element corresponding to the concept identifier, wherein the stored first local description comprises a description component that is specific to a respective UI, and wherein the stored first global description comprises a description component that is not specific to a UI; and query a representation of the current UI using the at least one first stored local description and first stored global description to determine whether the respective description can be used to reidentify the UI element, enable, via the current UI, an interactive prompt requesting user identification when the UI element cannot be reidentified using the respective description; and enable a user input to identify the UI element via a highlighting action on the current UI in response to the interactive prompt.

16. A non-transitory computer-readable storage medium comprising instructions which, when executed by a computer, cause the computer to carry out the steps of the method of claim 1.

* * * * *